(12) United States Patent
Cook

(10) Patent No.: US 9,505,150 B2
(45) Date of Patent: Nov. 29, 2016

(54) METHOD FOR CONSTRUCTING A REFRIGERATOR APPLIANCE

(71) Applicant: General Electric Company, Schenectady, NY (US)

(72) Inventor: Todd Duncan Cook, Cecilia, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 347 days.

(21) Appl. No.: 14/091,384

(22) Filed: Nov. 27, 2013

(65) Prior Publication Data

US 2015/0143697 A1    May 28, 2015

(51) Int. Cl.

| | | |
|---|---|---|
| A47B 96/04 | (2006.01) | |
| B29C 39/10 | (2006.01) | |
| F25D 23/06 | (2006.01) | |
| B29L 9/00 | (2006.01) | |
| B29L 31/00 | (2006.01) | |
| B29K 75/00 | (2006.01) | |
| B29K 105/04 | (2006.01) | |

(52) U.S. Cl.
CPC .......... B29C 39/10 (2013.01); F25D 23/064 (2013.01); B29K 2075/00 (2013.01); B29K 2105/04 (2013.01); B29L 2009/00 (2013.01); B29L 2031/7622 (2013.01); Y10T 29/49359 (2015.01)

(58) Field of Classification Search
CPC ................. B29L 2009/00; B29L 2031/7622; B29K 2105/04; B29K 2075/00; B29C 39/10; F25D 23/064; Y10T 29/49359
See application file for complete search history.

(56) References Cited

U.S. PATENT DOCUMENTS

| | | | | |
|---|---|---|---|---|
| 3,091,946 A | * | 6/1963 | Kesling | B29C 44/1242 156/78 |
| 3,286,004 A | * | 11/1966 | Hill | B29C 44/145 264/45.3 |
| 3,426,110 A | * | 2/1969 | Kesling | B29C 41/04 264/45.7 |
| 3,563,845 A | * | 2/1971 | Stevens | B29C 44/06 156/244.11 |
| 3,601,463 A | * | 8/1971 | Watt | A47B 71/00 220/592.09 |
| 4,294,880 A | * | 10/1981 | Nishida | B29C 44/0461 264/250 |
| 4,483,974 A | * | 11/1984 | Grogler | C07C 263/18 264/302 |
| 6,653,361 B2 | * | 11/2003 | Gilman | C08G 18/0885 521/110 |
| 2007/0001563 A1 | * | 1/2007 | Park | B29C 44/1238 312/406 |
| 2013/0042983 A1 | * | 2/2013 | Wachtell | E05B 81/10 160/327 |

* cited by examiner

*Primary Examiner* — Ryan J Walters
(74) *Attorney, Agent, or Firm* — Dority & Manning, P.A.

(57) ABSTRACT

A method for constructing a refrigerator appliance is provided. The method includes mounting a plurality of interior components of the refrigerator appliance to a mold body, applying a liner material to the mold body and removing an inner liner of the refrigerator appliance from the mold body. The method can assist with limiting mounting of components of the refrigerator appliance to the inner liner after formation of the inner liner.

20 Claims, 8 Drawing Sheets

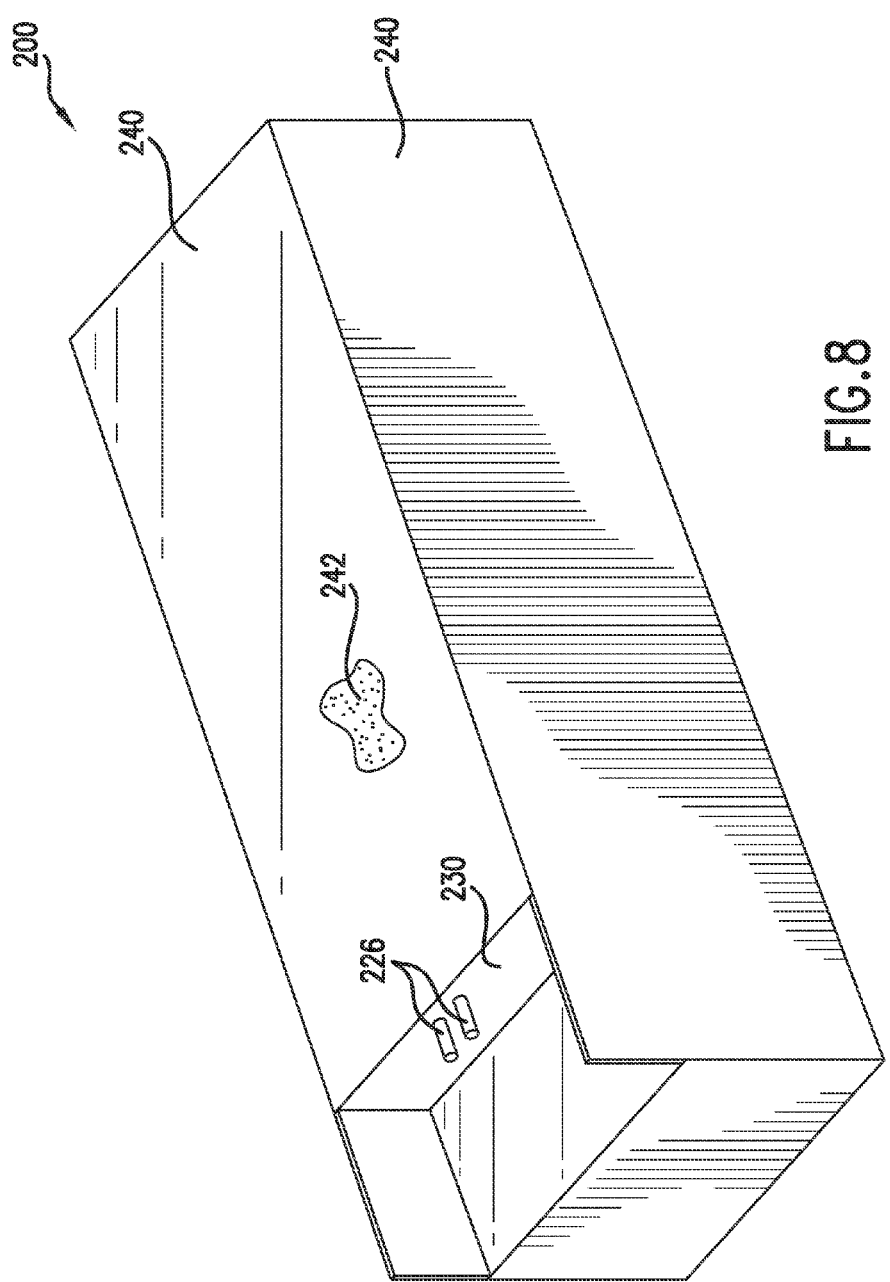

METHOD FOR CONSTRUCTING A REFRIGERATOR APPLIANCE

FIELD OF THE INVENTION

The present subject matter relates generally to refrigerator appliances and methods for constructing the same.

BACKGROUND OF THE INVENTION

Refrigerator appliances generally include a cabinet that defines chilled chambers for receipt of food items therein. The cabinets can include an inner liner and an outer casing. The inner liner is generally constructed of or with a plastic, and the outer casing is generally constructed of or with a metal.

Certain inner liners are constructed by thermoforming a sheet of plastic. After thermoforming the inner liner, various components of the refrigerator appliance are mounted to the inner liner, and the inner liner is mounted to the outer casing. Thermoforming the inner liner and constructing the cabinet in such a manner has certain drawbacks. For example, mounting components to the inner liner after thermoforming can be time consuming. As another example, when the components are mounted to the inner liner after thermoforming, insulation can flow through gaps between the components and the inner liner. To avoid such insulation leaks, time consuming taping or other gap filling is required.

Accordingly, a method for constructing a refrigerator appliance that assists with reducing a time required to mount components to an inner liner of the refrigerator appliance would be useful. In addition, a method for constructing a refrigerator appliance that assists with reducing or eliminating a gap between components mounted to an inner liner of the refrigerator appliance and the inner liner would be useful.

BRIEF DESCRIPTION OF THE INVENTION

The present subject matter provides a method for constructing a refrigerator appliance. The method includes mounting a plurality of interior components of the refrigerator appliance to a mold body, applying a liner material to the mold body and removing an inner liner of the refrigerator appliance from the mold body. The method can assist with limiting mounting of components of the refrigerator appliance to the inner liner after formation of the inner liner. Additional aspects and advantages of the invention will be set forth in part in the following description, or may be apparent from the description, or may be learned through practice of the invention.

In a first exemplary embodiment, a method for constructing a refrigerator appliance is provided. The method includes providing a mold body and a plurality of interior components, mounting the plurality of interior components to the mold body, applying a liner material to the mold body after the step of mounting and removing an inner liner of the refrigerator appliance from the mold body after the step of applying.

In a second exemplary embodiment, a method for constructing a refrigerator appliance is provided. The method includes providing a plurality of interior components and a mold body. The plurality of interior components includes at least one of an air duct, a light fixture, a temperature sensor, a drain conduit, a refrigerant conduit and a control panel. The mold body has a fresh food chamber mold portion and a freezer chamber mold portion. The method also includes mounting the plurality of interior components to the mold body. Respective ones of the plurality of interior components are mounted to each of the fresh food chamber mold portion and the freezer chamber mold portion at the step of mounting. The method further includes applying a liner material to the mold body after the step of mounting and removing an inner liner of the refrigerator appliance from the mold body after the step of applying.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 3, 4, 5, 6, 7 and 8 provide perspective views of a refrigerator appliance according to an exemplary embodiment of the subject matter in various stages of construction.

DETAILED DESCRIPTION

Figure 1:
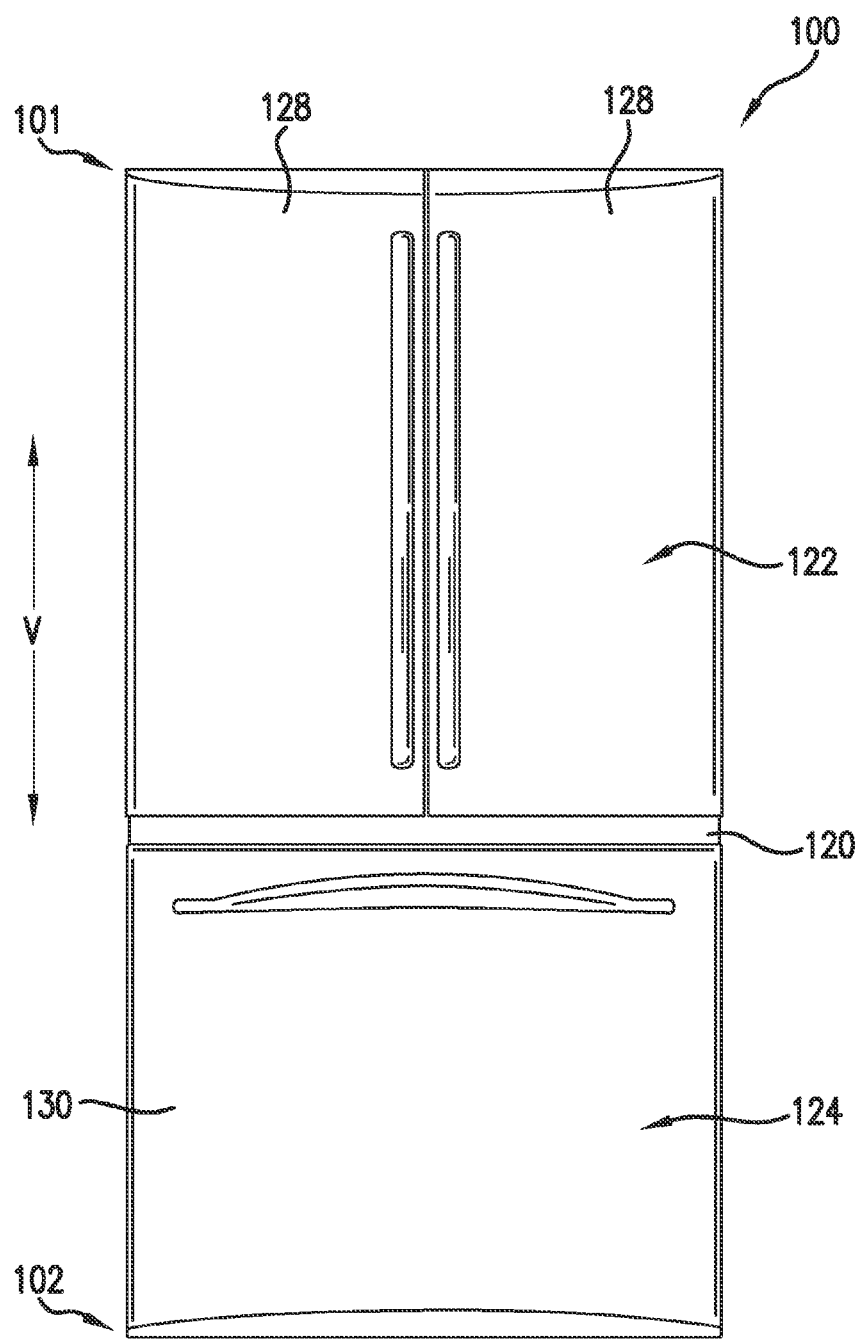
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
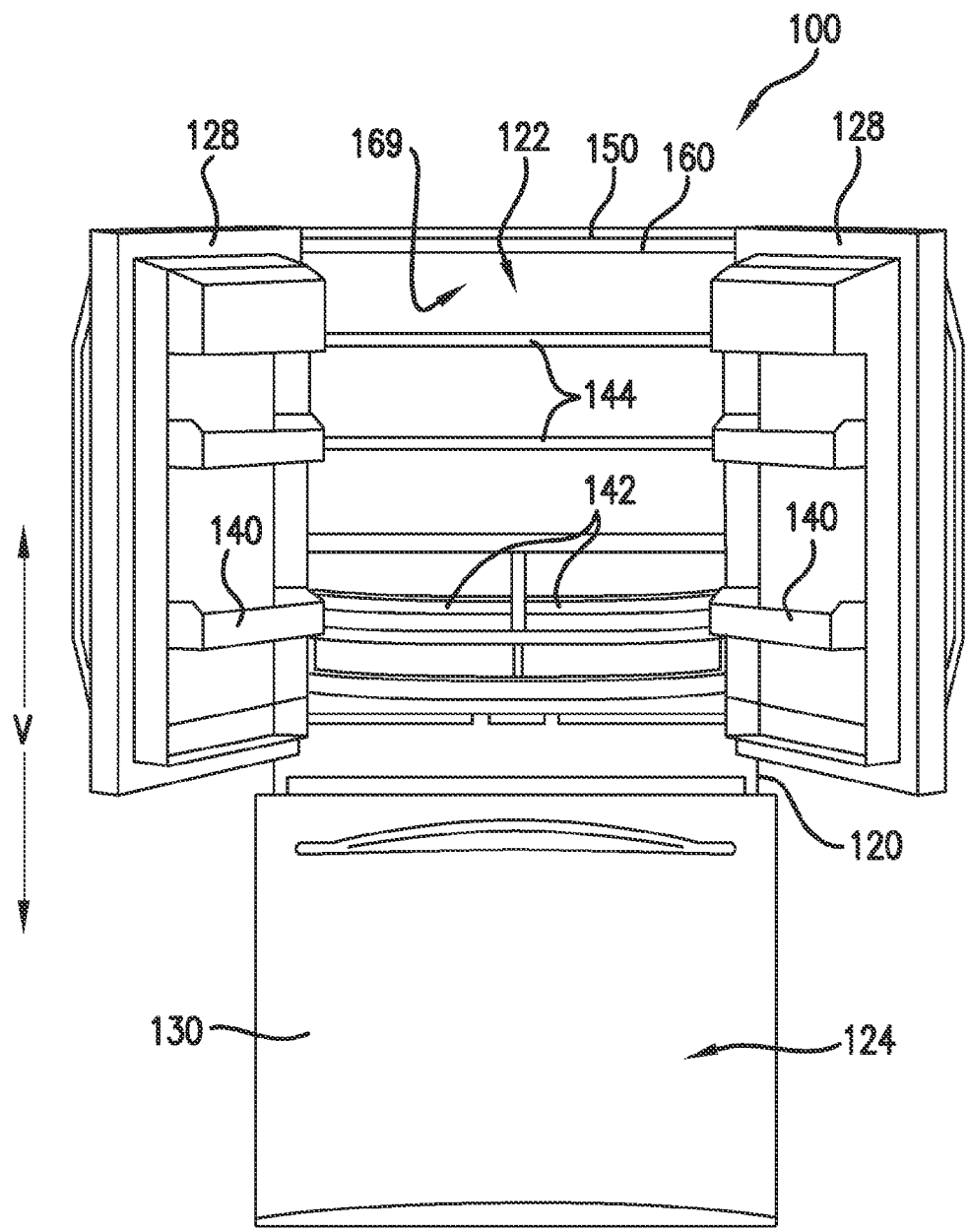
FIG. 2 provides a front, elevation view of the exemplary refrigerator appliance of FIG. 1 with doors of the exemplary refrigerator appliance shown in an open position.

FIG. 1 provides a front, elevation view of a refrigerator appliance 100 according to an exemplary embodiment of the present subject matter with refrigerator doors 128 of the refrigerator appliance 100 shown in a closed position. FIG. 2 provides a front view of refrigerator appliance 100 with refrigerator doors 128 shown in an open position to reveal a fresh food chamber 122 of refrigerator appliance 100.

Refrigerator appliance 100 includes a cabinet or housing 120 that extends between a top portion 101 and a bottom portion 102 along a vertical direction V. Housing 120 defines chilled chambers for receipt of food items for storage. In particular, housing 120 defines fresh food chamber 122 positioned at or adjacent top 101 of housing 120 and a freezer chamber 124 arranged at or adjacent bottom 102 of housing 120. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

Refrigerator doors 128 are rotatably hinged to an edge of housing 120 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of food items (e.g., beverages and/or solid food items) and may assist with organizing such food items. As an example, drawers 142 can receive fresh food items (e.g., vegetables, fruits, and/or cheeses) and increase the useful life of such fresh food items.

Refrigerator appliance 100 includes an inner liner 160 and an outer case 150. Inner liner 160 and outer case 150 are components of housing 120 and are assembled together to form housing 120 as discussed in greater detail below. Outer case 150 is exposed, e.g., such that outer case 150 can correspond to an outermost layer of housing 120. Outer case 150 may be formed by folding a sheet of a suitable material, such as pre-painted steel, into an inverted U-shape to form top and side walls of outer case 150.

Inner liner 160 is positioned within outer case 150 and defines the chilled chambers of housing 120. In particular, inner liner 160 defines fresh food chamber 122 and freezer chamber 124 of housing 120. Inner liner 160 can be formed from any suitable material, such as molded plastic. In certain exemplary embodiments, inner liner 160 is a single, integral component that defines both fresh food chamber 122 and freezer chamber 124. In alternative exemplary embodiments, inner liner 160 is constructed with multiple components (e.g., at least two components) that are connected or mounted to one another to define fresh food chamber 122 and freezer chamber 124 as discussed in greater detail below.

Inner liner 160 is mounted or secured to outer case 150. In particular, inner liner 160 may be mounted to outer case 150 such that inner liner 160 and outer case 150 are spaced apart from each other. Inner liner 160 may be mounted to outer case 150 using any suitable mechanism. For example, fasteners can be extended through flanges of inner liner 160 and outer case 150. In alternative exemplary embodiments, heat staking, ultrasonic welding, snap fit, or any other suitable mechanism may be used to mount inner liner 160 to outer case 150.

Refrigerator appliance 100 also includes a machinery compartment (not shown). A sealed system (not shown) for cooling air within chilled chambers of housing 120 may be positioned within machinery compartment. The sealed system includes components for executing a known vapor compression cycle for cooling air. The components include a compressor, a condenser, an expansion device, and an evaporator connected in series as a loop and charged with a refrigerant. The evaporator is a type of heat exchanger which transfers heat from air passing over the evaporator to the refrigerant flowing through the evaporator, thereby causing the refrigerant to vaporize. The cooled air is used to refrigerate one or more of the chilled chambers via fans. The construction and operation of the sealed system are well known to those skilled in the art.

FIGS. 3, 4, 5, 6, 7 and 8 provide perspective views of a refrigerator appliance 200 (FIG. 8) according to an exemplary embodiment of the subject matter in various stages of construction. Thus, FIGS. 3-8 illustrate a method for constructing, e.g., portions, of refrigerator appliance 200. It should be understood that while described in the context of constructing refrigerator appliance 200, the present subject matter can be used to construct any suitable refrigerator appliance, such as refrigerator appliance 100 (FIG. 1).

Figure 3:
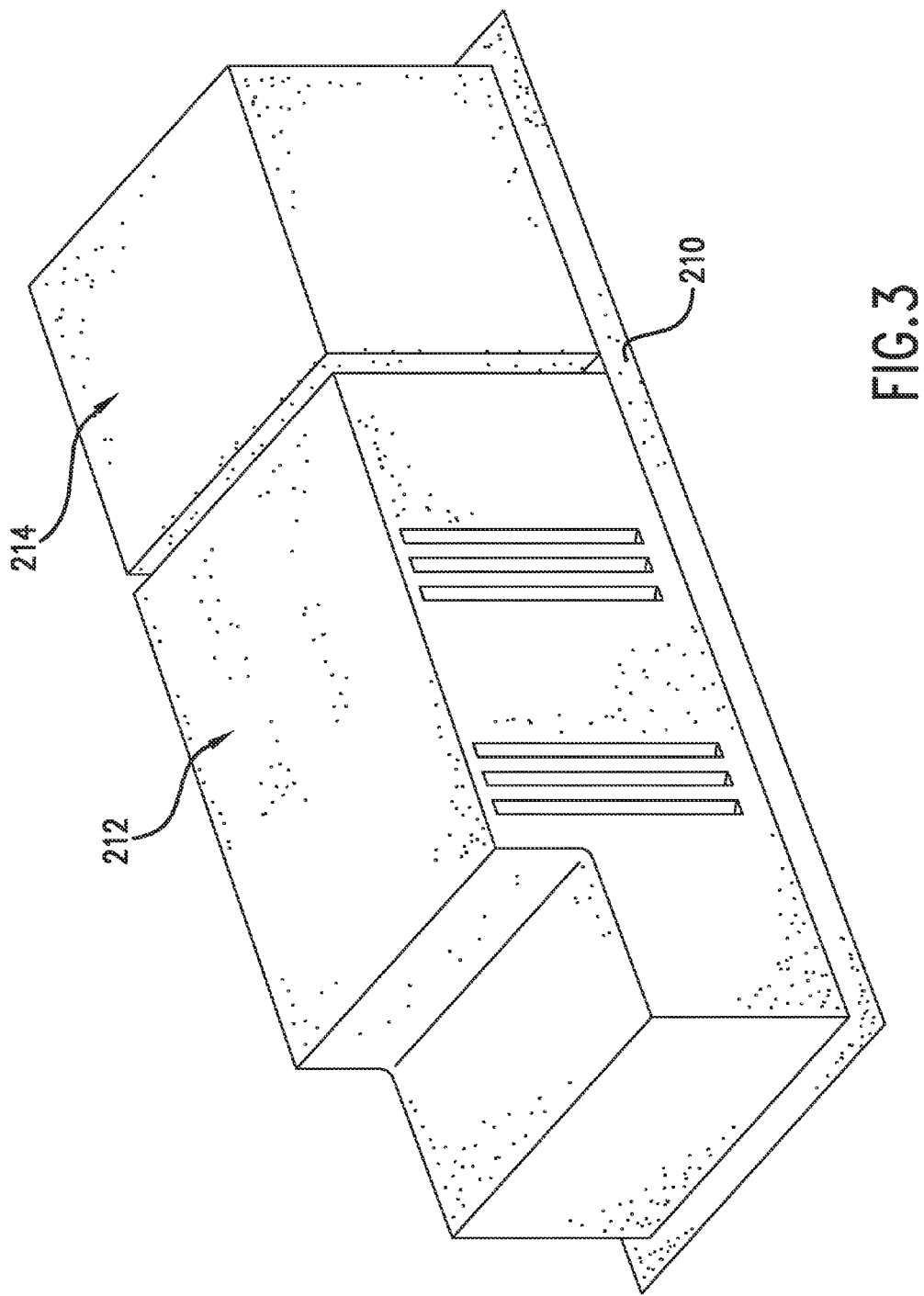

As may be seen in FIG. 3, a mold body 210 may be provided. Mold body 210 may include a fresh food portion 212 and a freezer portion 214. The size, position and arrangement of fresh food portion 212 and freezer portion 214 may be adjusted depending upon the desired style of refrigerator appliance. In FIG. 3, the position and arrangement of fresh food portion 212 and freezer portion 214 of mold body 210 correspond to a top mount refrigerator appliance. Mold body 210 can be constructed of or with any suitable material. For example, mold body 210 may be constructed of or with plastic foam or aluminum.

Figure 4:
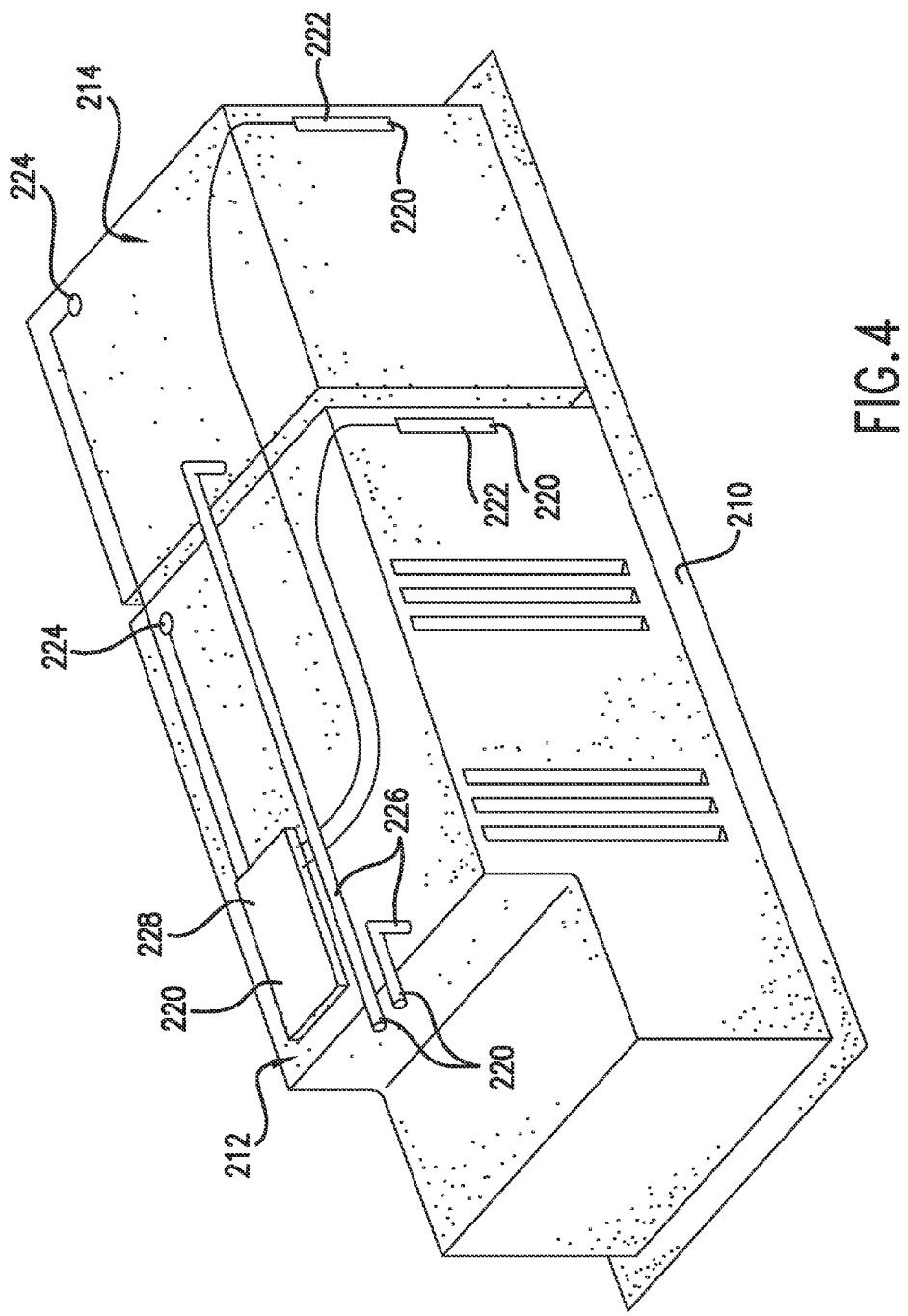

Turning now to FIG. 4, a plurality of interior components 220 are mounted to mold body 210. In particular, respective ones of interior components 220 may be mounted to each of fresh food portion 212 and freezer portion 214 of mold body 210. Interior components 220 can be mounted to mold body 210 using any suitable method or mechanism. For example, interior components 220 may be taped, glued, fastened or suctioned to mold body 210.

Interior components 220 can include any suitable components of refrigerator appliance 200, e.g., that are disposed at or on an inner liner 230 (FIG. 7) of refrigerator appliance 200. For example, interior components 220 may include light fixtures 222, temperature sensors 224, a drain conduit 226 and a control panel 228 as shown in FIG. 4. Interior components 220 may also include an air duct, mounting brackets or hardware, water filter manifolds, etc.

Figure 5:
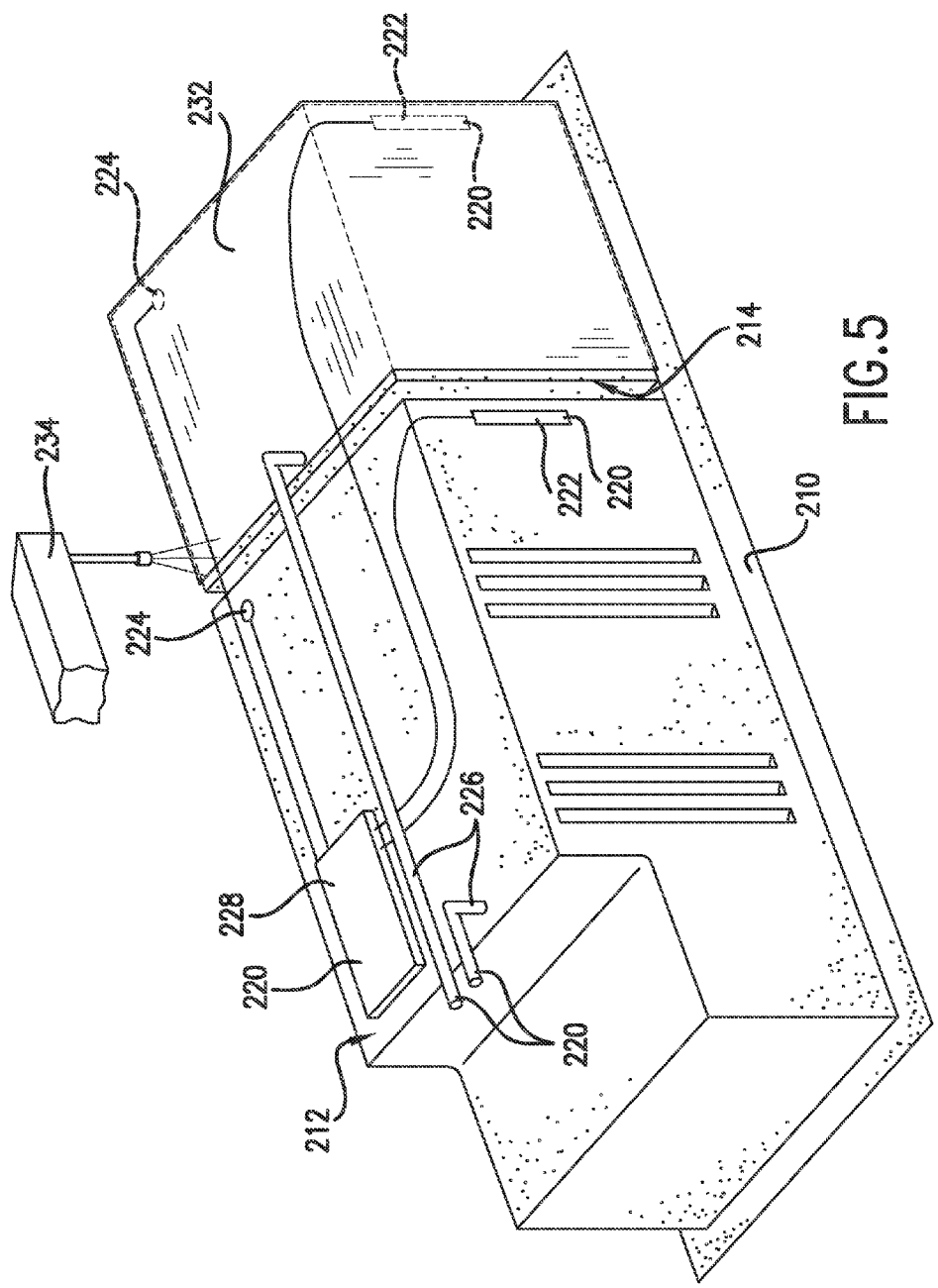
Figure 6:
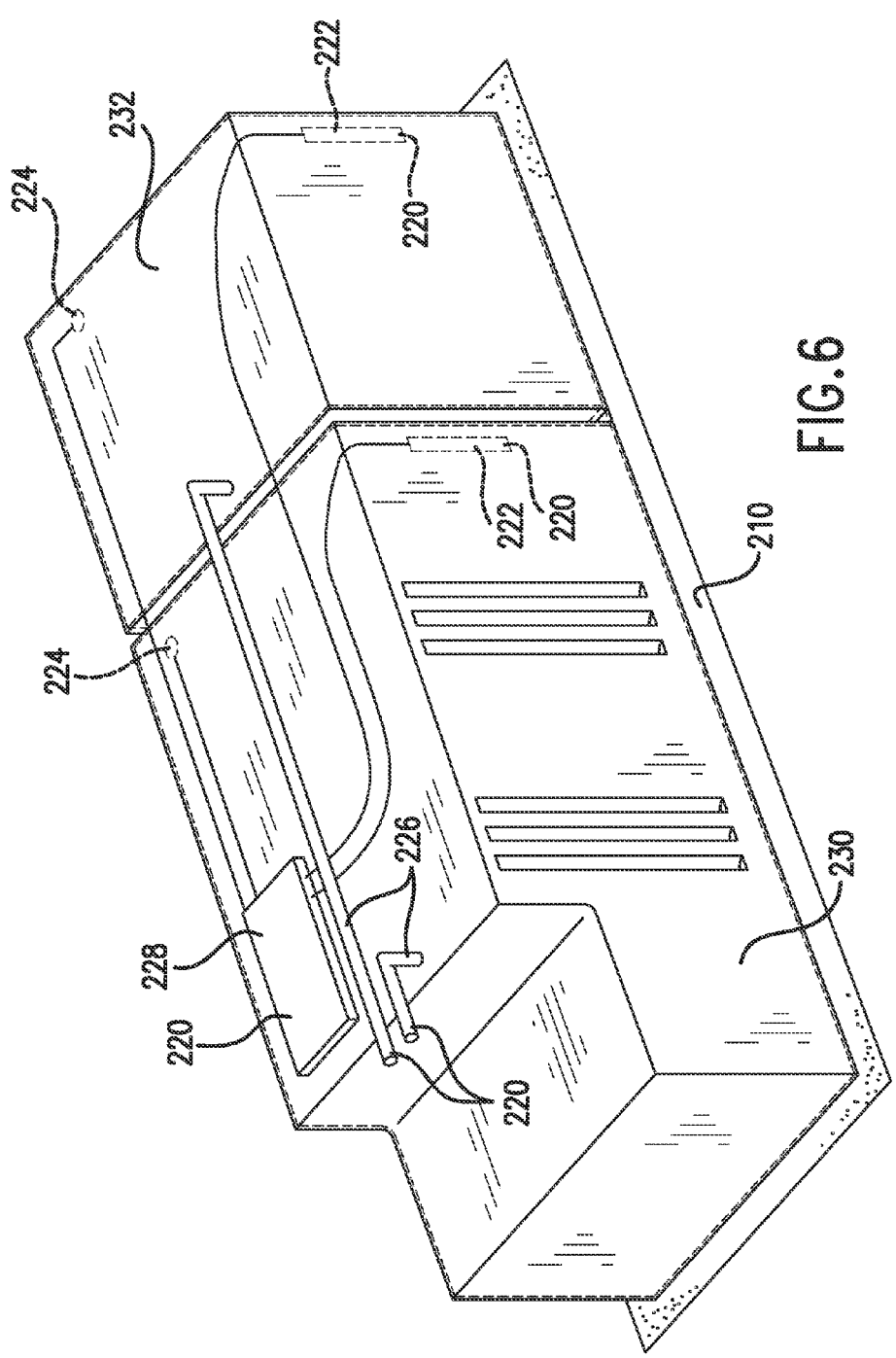

As may be seen in FIGS. 5 and 6, a liner material 232 is applied to mold body 210. In particular, liner material 232 may be applied to mold body 210 such that liner material 232 substantially covers at least one interior component of interior components 220 on mold body 210. By applying liner material 232 over interior components 220, formation of gaps or spaces around interior components 220 can be limited or eliminated.

Liner material 232 can be applied to mold body 210 in any suitable matter. For example, liner material 232 may be sprayed onto mold body 210, e.g., manually or using an automated spray assembly 234. Liner material 232 may also be slathered or poured onto mold body 210. Liner material 232 can includes any suitable materials. For example, liner material 232 may include polyurethane and a mold-release agent. In alternative exemplary embodiments, liner material 232 may include vinyl ester, unsaturated polyester, polyester cyclics, epoxies, polyisocyanurates, silicones, siloxanes, etc.

Figure 7:
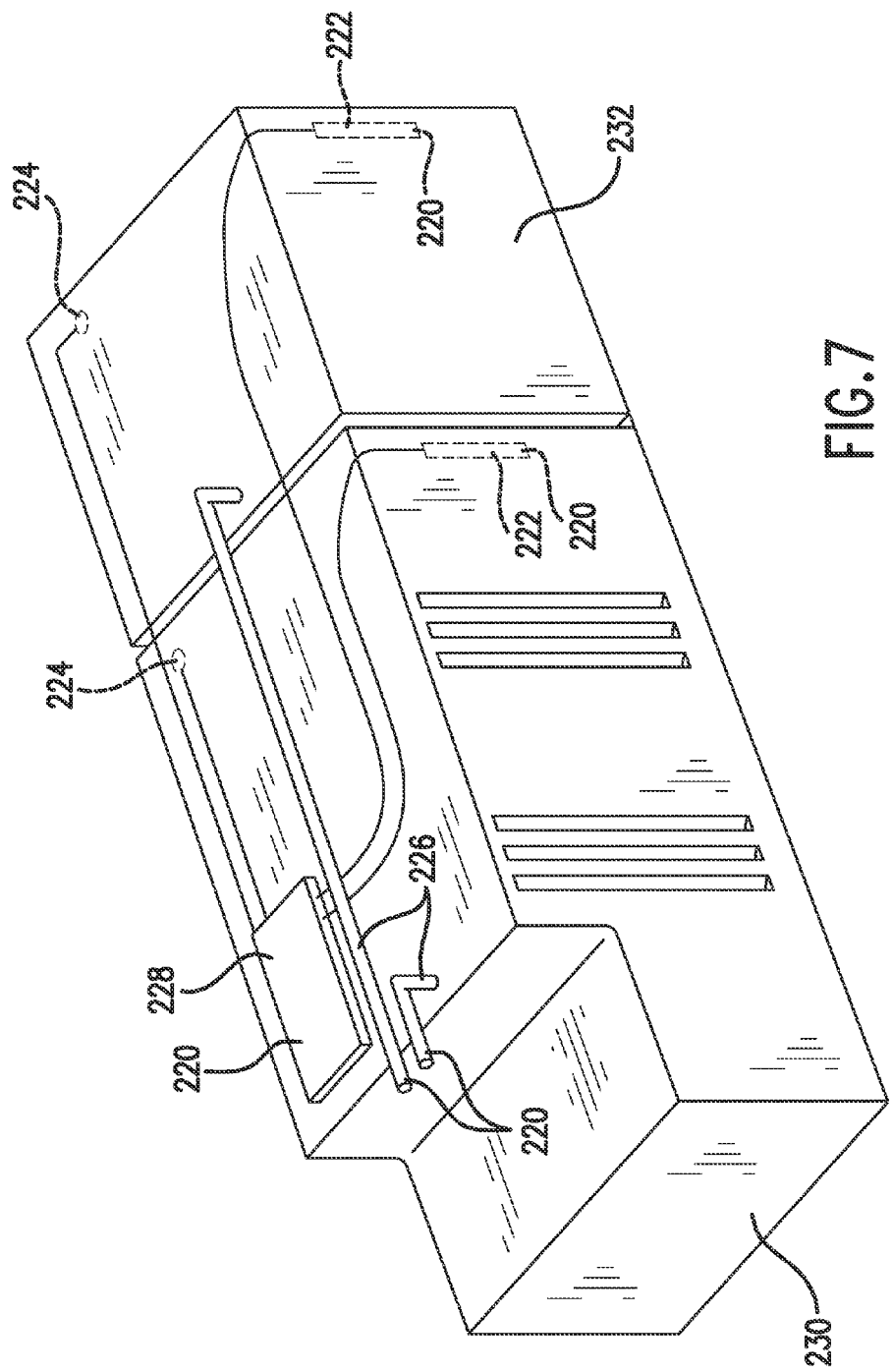

Turning from FIG. 6 to FIG. 7, liner material 232 may cure or otherwise harden on mold body 210 to form inner liner 230. As may be seen in FIG. 8, inner liner 230 can be removed from mold body 210. The mold-release agent within liner material 232 can assist with such removal. Due to mounting of interior components 220 on mold body 210 prior to applying liner material 232 onto mold body 210, interior components 220 are mounted to or positioned within inner liner 230 during formation of inner liner 230. In such a manner, construction time of refrigerator appliance 200 can be reduced, e.g., relative to mounting interior components 220 to inner liner 230 after formation of inner liner 230.

As may be seen in FIG. 8, an outer casing 240 is mounted to inner liner 230. Outer casing 240 can be constructed of or with any suitable material. For example, outer casing 240 may be constructed of or within a metal, such as steel. Thus, outer casing 240 may be constructed of a harder material than inner liner 230, e.g., in order to protect inner liner 230. Insulation 242, such as polyurethane foam, may be injected between inner liner 230 and outer casing 240, e.g., in order to assist with insulating refrigerator appliance 200. Due to mounting of interior components 220 on mold body 210 prior to applying liner material 232 onto mold body 210, gaps or spaces between interior components 220 and inner liner 230 can be reduced or eliminated. Thus, taping or other filing of such gaps or spaces prior to injecting insulation 242 between inner liner 230 and outer casing 240 can be eliminated or reduced, e.g., relative to mounting interior components 220 to inner liner 230 after formation of inner liner 230.

It should be understood that inner liner 230 need not be constructed as a single integral continuous or component as shown in the exemplary embodiment illustrated in FIGS. 3-8. Thus, in alternative exemplary embodiments, inner liner 230 may include multiple portions mounted to each other to form inner liner 230. In particular, a first portion of inner liner 230 may be formed on fresh food portion 212 of mold body 210 in the manner described above and a second portion of inner liner 230 may be formed on freezer portion 214 of mold body 210 in the manner described above. The first and second portions of inner liner 230 may be mounted to each other and/or outer casing 240 to construct refrigerator appliance 200. In such exemplary embodiments, mold body 210 includes a suitable number of discrete portions for forming respective sections of inner liner 230 thereon.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for constructing a refrigerator appliance, comprising:
   providing a mold body and a plurality of interior components;
   mounting the plurality of interior components to the mold body;
   applying a liner material to the mold body and to at least one of the plurality of interior components after said step of mounting, wherein the liner material is hardened to form an inner liner of the refrigerator appliance whereby the plurality of interior components are mounted to or positioned within the inner liner; and
   removing the inner liner of the refrigerator appliance with the plurality of interior components connected thereto from the mold body after said step of applying.

2. The method of claim 1, wherein the mold body comprises a fresh food portion and a freezer portion.

3. The method of claim 1, wherein the mold body comprises aluminum or plastic foam.

4. The method of claim 1, wherein the plurality of interior components comprises a duct, a light fixture, a temperature sensor, a drain conduit, a refrigerant conduit or a control panel.

5. The method of claim 1, wherein said step of applying comprises spraying the liner material onto the mold body.

6. The method of claim 5, wherein the liner material comprises polyurethane.

7. The method of claim 1, further comprising mounting an outer casing the inner liner after said step of removing.

8. The method of claim 7, wherein the liner material comprises polyurethane and the outer casing comprises steel.

9. The method of claim 7, further comprising injecting insulation between the inner liner and the outer casing after said step of mounting.

10. The method of claim 9, wherein the insulation comprises polyurethane foam.

11. The method of claim 1, wherein said step of applying comprises applying the liner material to the mold body such that the liner material substantially covers at least one interior component of the plurality of interior components on the mold body.

12. The method of claim 1, wherein the liner material comprises a mold release agent.

13. A method for constructing a refrigerator appliance, comprising:
   providing a plurality of interior components and a mold body, the plurality of interior components including at least one of an air duct, a light fixture, a temperature sensor, a drain conduit, a refrigerant conduit and a control panel, the mold body having a fresh food chamber mold portion and a freezer chamber mold portion;
   mounting the plurality of interior components to the mold body, respective ones of the plurality of interior components mounted to each of the fresh food chamber mold portion and the freezer chamber mold portion;
   applying a liner material to the mold body and to at least one of plurality of interior components after said step of mounting, wherein the liner material is hardened to form an inner liner of the refrigerator appliance whereby the plurality of interior components are mounted to or positioned within the inner liner; and
   removing the inner liner of the refrigerator appliance with the plurality of interior components mounted thereon from the mold body after said step of applying.

14. The method of claim 13, wherein said step of applying comprises spraying the liner material onto the mold body.

15. The method of claim 14, wherein the liner material comprises polyurethane and a mold-release agent.

16. The method of claim 13, further comprising mounting an outer casing to the inner liner after said step of removing.

17. The method of claim 16, wherein the liner material comprises polyurethane and the outer casing comprises steel.

18. The method of claim 17, further comprising injecting insulation between the inner liner and the outer casing after said step of mounting.

19. The method of claim 13, wherein said step of applying comprises applying the liner material to the mold body such that the liner material substantially covers at least one interior component of the plurality of interior components on the mold body.

20. The method of claim 13, wherein the mold body comprises aluminum or plastic foam.

* * * * *